US011618491B2

(12) United States Patent
Mastroianni

(10) Patent No.: US 11,618,491 B2
(45) Date of Patent: Apr. 4, 2023

(54) DOLLY

(71) Applicant: TOYOTA MATERIAL HANDLING MANUFACTURING ITALY S.p.A., Bologna (IT)

(72) Inventor: Francesco Mastroianni, Lucca (IT)

(73) Assignee: TOYOTA MATERIAL HANDLING MANUFACTURING ITALY S.P.A, Bologna (IT)

( * ) Notice: Subject to any disclaimer, the term of this patent is extended or adjusted under 35 U.S.C. 154(b) by 67 days.

(21) Appl. No.: 17/307,625

(22) Filed: May 4, 2021

(65) Prior Publication Data

US 2021/0347398 A1 Nov. 11, 2021

(30) Foreign Application Priority Data

May 6, 2020 (IT) .......................... 102020000010012

(51) Int. Cl.
| | | |
|---|---|---|
| *B62B 5/00* | (2006.01) | |
| *B60P 1/52* | (2006.01) | |
| *B62B 3/00* | (2006.01) | |
| *B62B 3/12* | (2006.01) | |
| *B62D 33/02* | (2006.01) | |

(Continued)

(52) U.S. Cl.
CPC .............. *B62B 5/0043* (2013.01); *B60P 1/52* (2013.01); *B62B 3/008* (2013.01); *B62B 3/12* (2013.01); *B62D 33/02* (2013.01); *B62D 61/06* (2013.01); *B62D 61/10* (2013.01)

(58) Field of Classification Search
CPC ......... B62B 3/00; B62B 5/0043; B62B 3/008; B62B 3/12; B60P 1/52; B62D 33/02; B62D 61/06; B62D 61/10
See application file for complete search history.

(56) References Cited

U.S. PATENT DOCUMENTS

| 7,267,349 B2 * | 9/2007 | Sica ....................... B60G 3/185 |
| | | 187/222 |
| 9,593,003 B2 * | 3/2017 | Goncalves .............. B66F 9/065 |

(Continued)

FOREIGN PATENT DOCUMENTS

DE 2122428 A1 11/1972

OTHER PUBLICATIONS

Italian Search Report dated Jan. 11, 2021 from counterpart Italian Patent Application No. 10202000010012.

*Primary Examiner* — Toan C To
(74) *Attorney, Agent, or Firm* — Shuttleworth & Ingersoll, PLC; Timothy Klima

(57) ABSTRACT

A dolly for indoor and outdoor use including a supporting frame extending along a main axis of extension and a loading platform mounted above said frame. The dolly also includes at least one steering and drive wheel coupled to the bottom of the frame and at least one pair of idle wheels coupled to the bottom of the frame and positioned symmetrically relative to the main axis of extension. The dolly also includes a control structure including a plurality of sensors configured for measuring a plurality of operating parameters of the dolly and for generating respective signals representing operating parameters and a processing unit configured to receive the representative signals and to impart a steering command to the at least one steering and drive wheel at least as a function of the representative signals.

13 Claims, 5 Drawing Sheets

(51) Int. Cl.
*B62D 61/06* (2006.01)
*B62D 61/10* (2006.01)

(56) References Cited

U.S. PATENT DOCUMENTS

| | | | |
|---|---|---|---|
| 2015/0102274 A1* | 4/2015 | He | B66F 9/08 |
| | | | 254/2 C |
| 2015/0274496 A1* | 10/2015 | Goncalves | B62B 3/0612 |
| | | | 280/124.136 |
| 2017/0349197 A1* | 12/2017 | Jonasson | B62B 5/0069 |
| 2018/0065653 A1* | 3/2018 | Rusche | B21D 22/02 |
| 2019/0113932 A1 | 4/2019 | Williams | |
| 2019/0233028 A1* | 8/2019 | Tengvert | B66F 9/063 |
| 2020/0114714 A1 | 4/2020 | Doan | |
| 2020/0299118 A1* | 9/2020 | Kurita | B62B 3/0612 |
| 2021/0061352 A1* | 3/2021 | Lee | B66F 9/07586 |
| 2021/0179403 A1* | 6/2021 | Nakamura | G05D 1/021 |

* cited by examiner

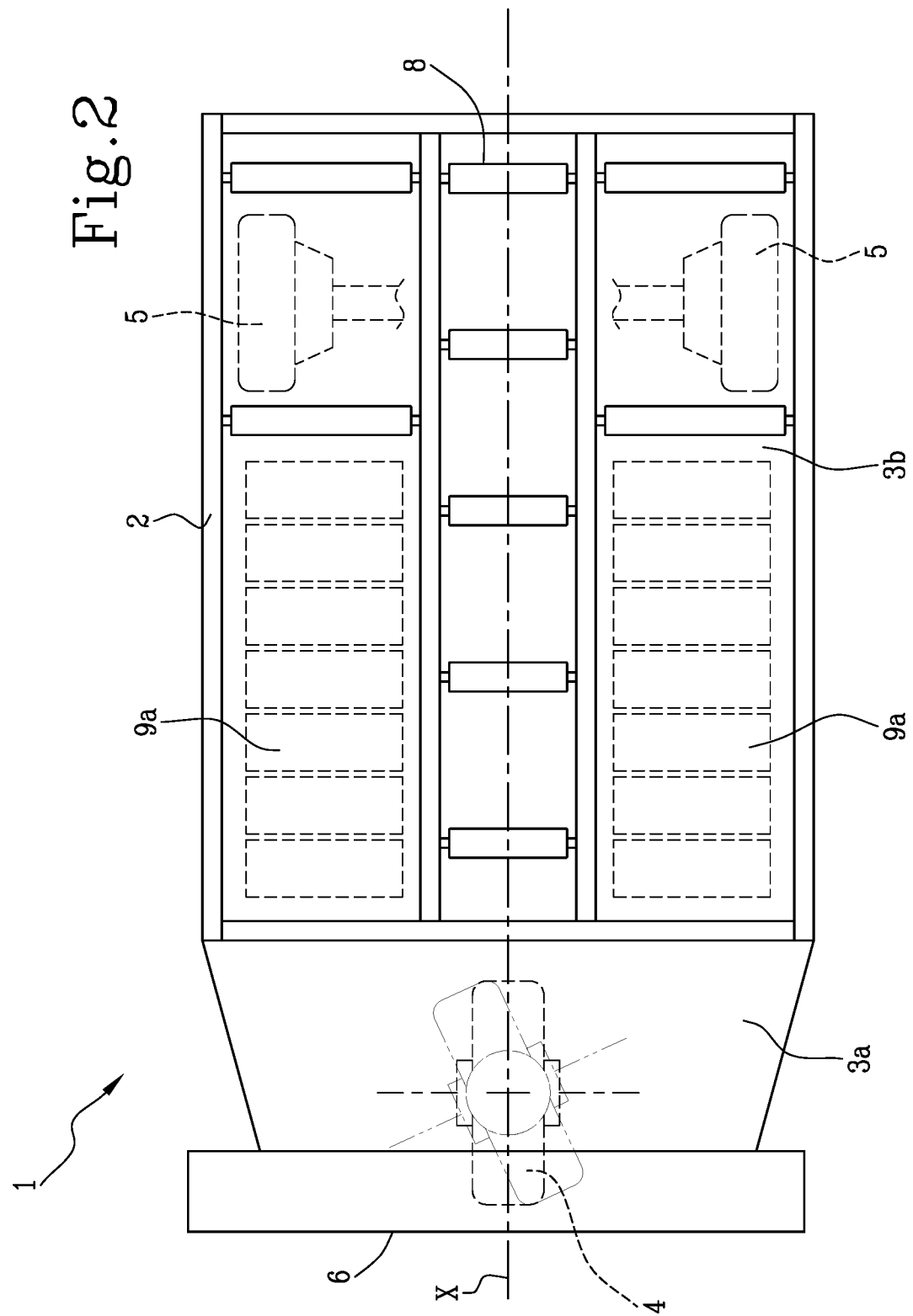

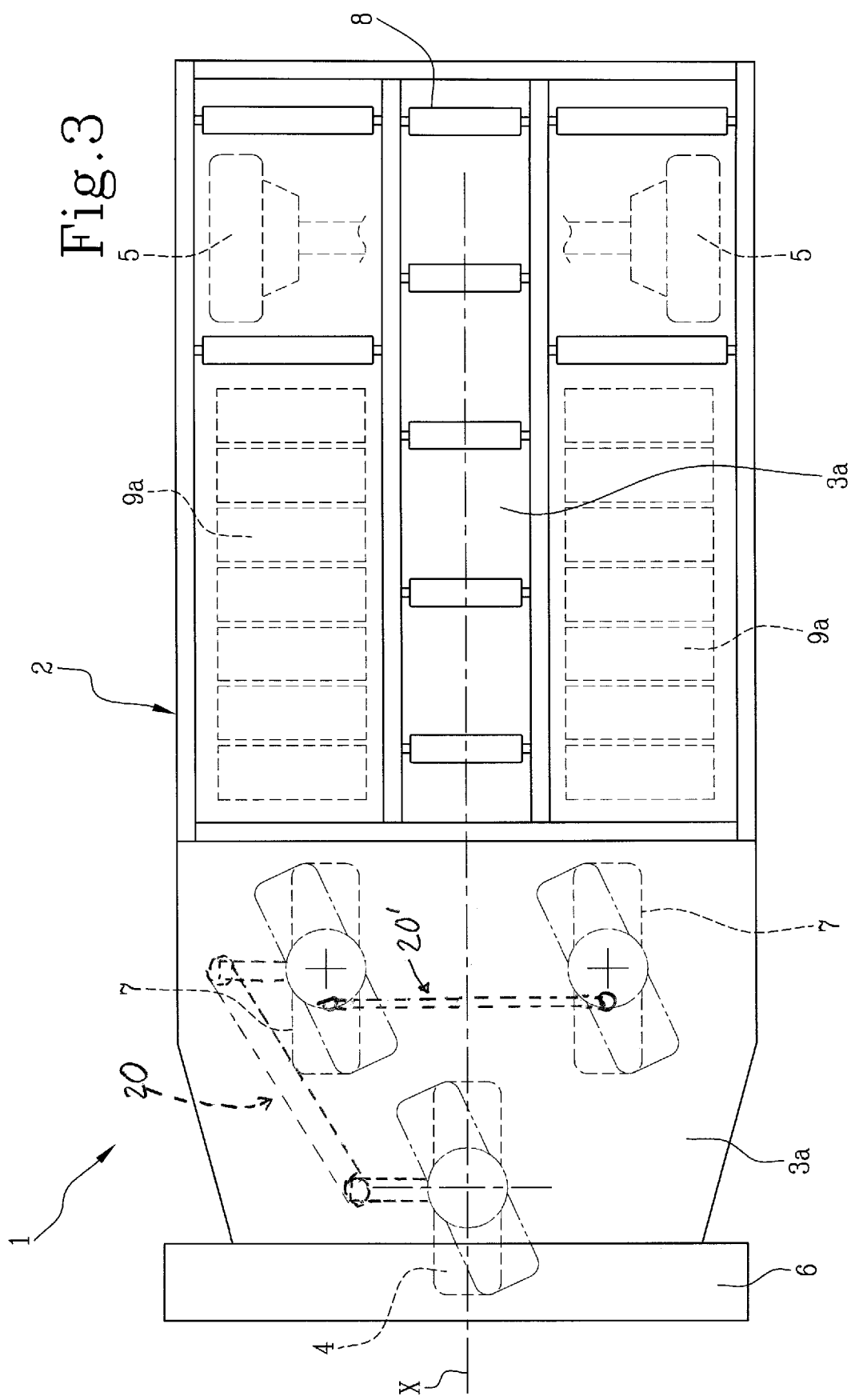

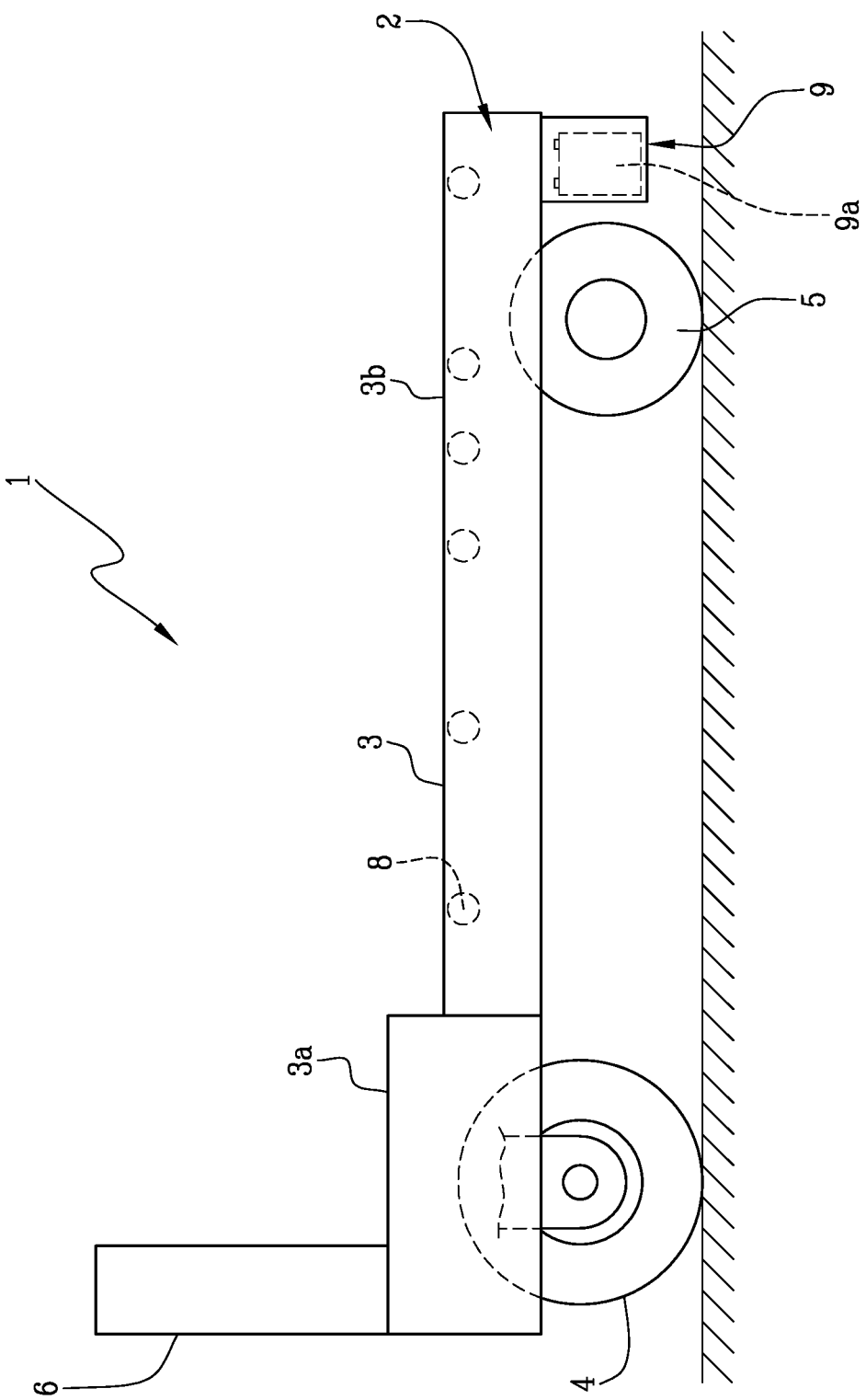

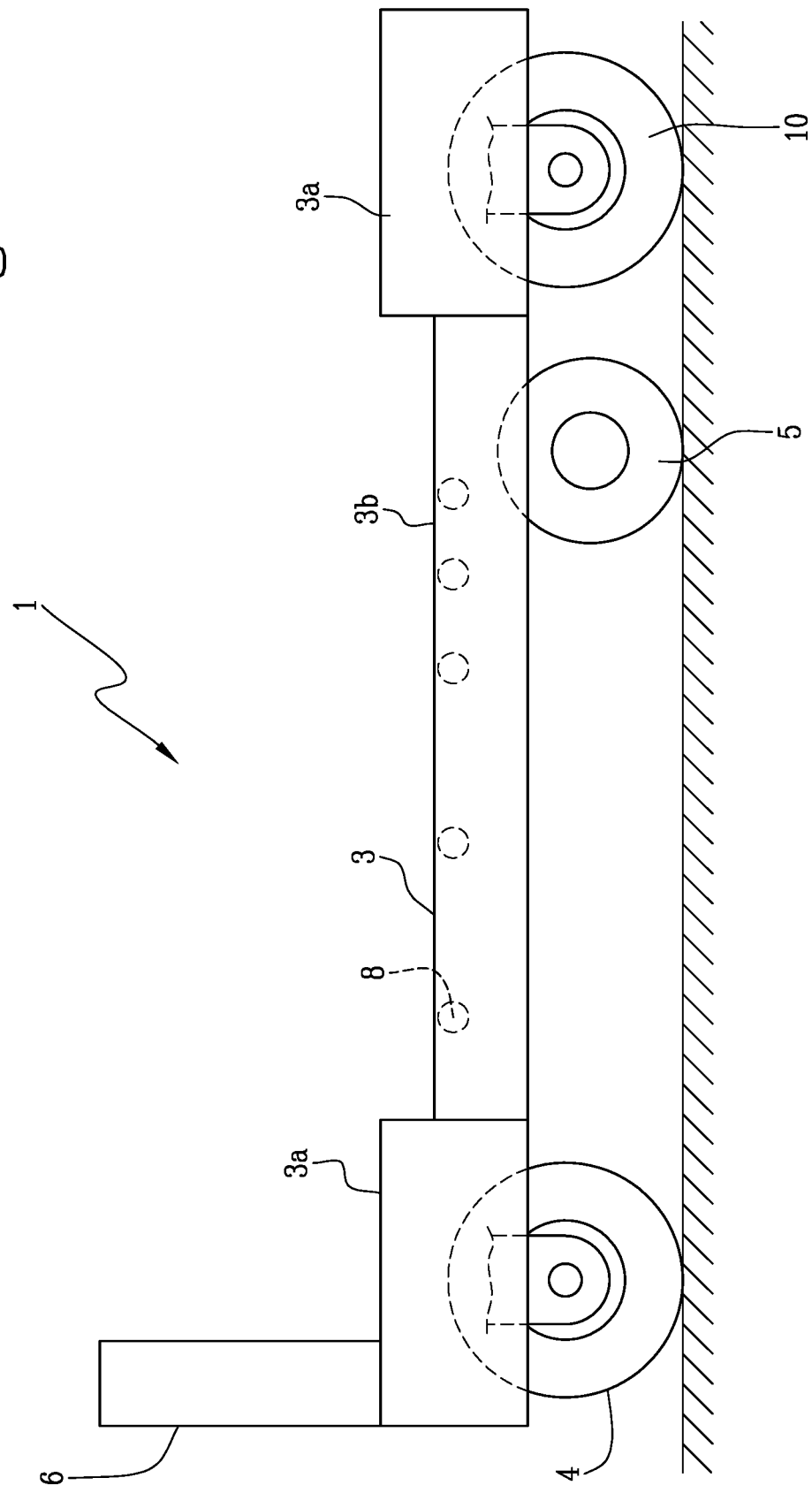

DOLLY

CROSS-REFERENCE TO RELATED APPLICATIONS

This application claims priority to Italian Patent Application 102020000010012 filed May 6, 2020, the entirety of which is incorporated by reference herein.

BACKGROUND OF THE INVENTION

This invention relates to a dolly which is widely used in industrial production chains and also in ports, airports and interports.

In fact, in large industrial production chains there is a particular need to be able to transport the processing material between the various stations of the production chain in a fast and efficient manner.

There are both AGV dollies (Automatic Guided Vehicles) and remote-controlled dollies.

As is known, the dollies are small vehicles equipped with an automatic or remote control driving system which are able to move a load from one point to another of a factory (or, generically, of a shed) where the production chain is located. Some dollies are also designed for transporting and moving material from inside the factory towards a point outside the factory.

Usually, the dollies are equipped with a plurality of wheels pivoted to a frame on which is mounted a loading platform configured for supporting a plurality of packs of material to be moved from one processing station to the other.

In the case of remote-controlled dollies, the dolly is controlled remotely during its movement in such a way as to follow a predetermined trajectory.

In the case of AGV dollies, they are configured to autonomously follow a predetermined trajectory which must therefore be clear of any obstacles.

Alternatively, the AGV dollies may be configured to run on tracks in such a way as to follow a predetermined path between the processing stations. In this case, too, the tracks must be clear of any obstacles.

Disadvantageously, the prior art dollies lave some problems relating to the flexibility and ease of use.

In fact, AGV dollies or remote control dollies are not easy to maneuver and are not able to steer to change their trajectory if necessary, for example if there are obstacles along their path.

The prior art dollies are also not able to recognize the presence of obstacles along the path, in particular obstacles positioned at a certain height above ground.

Although there are prior art dollies, in particular AGV dollies, equipped with sensors, they have a distribution of these sensors which is not optimum, thus making the control and movement of the dolly not very efficient and difficult.

In addition, the prior art dollies, in particular the dollies which are used outside factory sheds, are not very practical during the operations for loading/unloading packs of material.

In effect, prior art dollies have four wheels of equal diameter which define the minimum height above the ground of the loading platform. If these wheels are large, such as those used for dollies for outdoor use, the loading platform is positioned at a great height which is not very functional and is uncomfortable during the operations for loading and unloading the material.

In other words, since the wheels of the dollies for outdoor use are larger than the standard wheels, the loading platform undergoes a lifting, thus causing an increase in the difficulty of loading and unloading packs of material, especially in the case of large packages.

The technical purpose of the invention is therefore to provide a doily which is able to overcome the drawbacks of the prior art.

The aim of this invention is therefore to provide a dolly which is flexible and practical to move in all difficult applications.

A further aim of the invention is to provide a dolly which is easy and convenient to handle during the operations for loading and unloading packs of material.

The technical purpose indicated and the aims specified are substantially achieved by a dolly comprising the technical features described in one or more of the appended claims. The dependent claims correspond to possible embodiments of the invention.

Further features and advantages of the invention are more apparent in the non-limiting description which follows of a non-exclusive embodiment of a dolly.

BRIEF DESCRIPTION OF THE DRAWINGS

The description is set out below with reference to the accompanying drawings which are provided solely for purposes of illustration without restricting the scope of the invention and in which:

FIG. 2 is a top view of the dolly of FIG. 1;
FIG. 3 is a top view of a further embodiment of the dolly according to the invention;
FIG. 4 is a side view of a further embodiment of a dolly;
FIG. 5 is a side view of a further embodiment of a dolly.

DETAILED DESCRIPTION OF THE INVENTION

Figure 1:
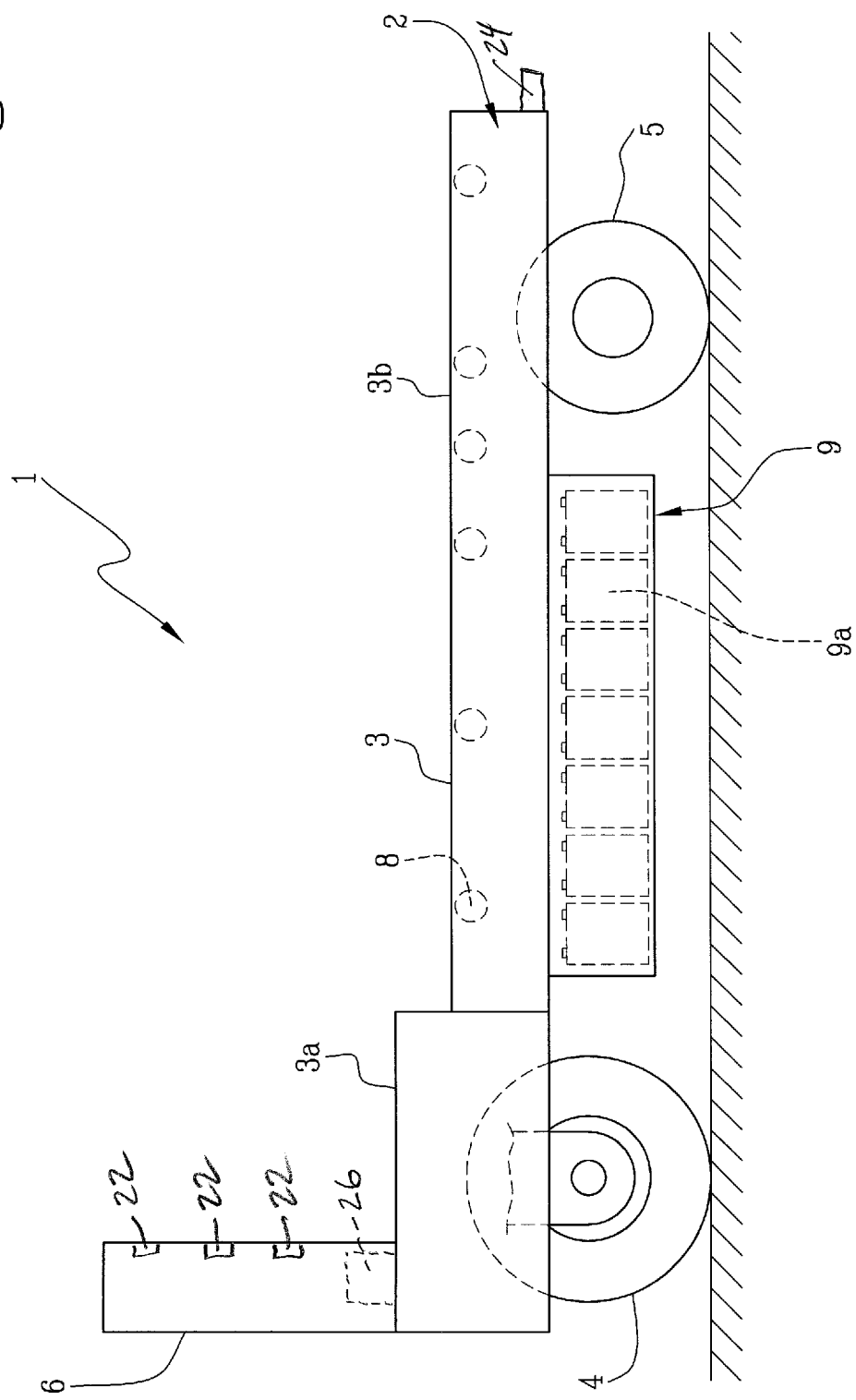
FIG. 1 is a side view of a dolly according to the invention.

With reference to the accompanying drawings, the numeral 1 denotes a dolly according to the invention.

The term "dolly" means a motor-driven carriage having a plurality of wheels and a loading platform designed to receive packs of material to be moved along a trajectory.

For convenience of description, the platform carriage will be referred to simply as dolly.

The dolly 1 comprises a frame 2 extending along a main axis of extension "X" and having, in plan view, a substantially polygonal shape.

In the embodiment illustrated in the accompanying drawings, the frame 2 has, in plan view, a rectangular shape joined to a trapezoidal shape. In another embodiment, not illustrated, the frame 2 may have a rectangular or square shape in plan view.

The dolly 1 also comprises, below the frame 2 and preferably in a central zone of the frame 2, a compartment 9 in which a plurality of batteries 9a are inserted, configured for powering a motor of the dolly 1.

Alternatively, as shown in FIG. 4, the compartment 9 may be positioned at one end of the frame 2. This positioning is particularly advantageous if the dolly 1 comprises a control structure 6, which is described in detail below, located at one of the ends of the doily 1. In fact, in this situation, the compartment 9 for containing the batteries 9a is at one end of the dolly 1 and the control structure 6 is at the opposite end, so as to be balanced, especially in terms of weight, in an optimum manner.

As shown in FIG. 1, the dolly 1 also comprises at least one steering and drive wheel 4 coupled to the bottom of the frame 2 and at least a pair of idle wheels 5, also coupled to the bottom of the frame 2 and positioned symmetrically relative to the main axis of extension "X".

Preferably, the steering and drive wheel 4 is pivoting, that is to say, it can be oriented freely in all directions by turning about a vertical axis (perpendicular to the ground).

Advantageously, the presence of a steering and drive wheel 4 makes the dolly 1 easier to handle since it allows the dolly 1 to follow trajectories also having curvilinear stretches.

Advantageously, the steering and drive wheel 4 also allows the dolly 1 to travel along bends, in particular bends having small radiuses of curvature, making the dolly 1 particularly suitable for moving loads inside particularly narrow spaces.

As shown in the accompanying drawings, the steering and drive wheel 4 has a diameter greater than the pair of idle wheels 5. This size of the steering and drive wheel 4 is advantageous if the dolly 1 is used outside a factory, that is to say, in a place where the ground is uneven and not perfectly smooth, since it allows the dolly 1 to easily overcome the obstacles present on the ground.

Looking in more detail at the embodiment shown in FIGS. 1 and 2, the dolly 1 has a single steering and drive wheel 4 positioned at a first end of the frame 2 and a single pair of idle wheels 5 positioned at a second end of the frame 2.

In this embodiment, the steering and drive wheel 4 is positioned on the main axis of extension "X" of the frame 2 whilst the idle wheels 5 are positioned symmetrically relative to the main axis of extension "X" in such a way as to form with the steering and drive wheel 4 vertices of a triangle.

The number of wheels of the dolly 1 and their relative positioning may, however, vary depending on the load which the dolly 1 must move.

In particular, the bulkier the load, the larger are the dimensions of the dolly 1 and more wheels are therefore advantageously installed for moving it in such a way as to improve the stability of the dolly and better support the transported load.

As shown in the embodiment of FIG. 3, in the case of large dollies 1, the dolly 1 also comprises a pair of directional wheels 7 interposed between the steering wheel and drive wheel 4 and the pair of idle wheels 5. The directional wheels 7 are positioned symmetrically about the main axis of extension X and occupy a position close to the steering and drive wheel 4. In this embodiment, the dolly 1 also comprises a transmission rod 20, 20' configured for kinematically coupling the pair of directional wheels 7 with the steering and drive wheel 4 in such a way that the directional wheels 7 steer together with the steering and drive wheel 4. The term "together" means that the pair of directional wheels 7 steer simultaneously and by the same angle relative to the steering and drive wheel 4.

In other words, the transmission rod constrains the directional wheels 7 to the steering and drive wheel 4 in such a way that the directional wheels 7 are forced to rotate at the same instant and by the same angle of curvature as the steering and drive wheel 4.

Advantageously, the transmission rod and the pair of directional wheels 7 allow a dolly 1 to be obtained which is easy to handle despite the large dimensions since they allow the dolly 1 to follow trajectories also comprising curvilinear stretches.

Advantageously, the possibility of steering makes the dolly 1 extremely versatile and able to follow any type of trajectory even if the dolly 1 has to transport large loads and therefore has a considerable length.

If the load is particularly long, that is to say, if the load extends mainly along the main axis of extension "X", the dolly 1 has a frame 2 having an elongate shape along the main axis of extension "X". In that case, a plurality of pairs of idle wheels 5 suitably distributed along the frame 2 are mounted under the frame 2.

In a further possible embodiment, not illustrated, the dolly 1 may have a different arrangement of the wheels. More specifically, the dolly 1 may have a steering and drive wheel 4 positioned laterally relative to the main axis of extension "X" and a directional wheel 7 positioned symmetrically to the steering and drive wheel 4 relative to the main axis of extension "X". More in detail, in this embodiment, the directional wheel 7 is kinematically coupled to the steering and drive wheel 4 by a transmission rod in such a way that the directional wheel 7 steers together with the steering and drive wheel 4, that is to say, is rotated at the same instant and by the same amount as the steering and drive wheel 4.

In this embodiment, the dolly 1 may also have a plurality of pairs of idle wheels 5 positioned along the main axis of extension "X". In this embodiment, therefore, the wheels are positioned in pairs along the main axis of extension "X" in such a way that each steering wheel 4 is coupled to a respective directional wheel 7 and each idle wheel 5 is coupled to a respective idle wheel 5.

More generally speaking, therefore, depending on the load the dolly 1 is designed to move, there is a variable number of wheels connected below the frame 2 according to different distributions.

Preferably, if the number of wheels is odd, as shown in the accompanying drawings, the dolly 1 has a steering wheel 4 positioned on the main axis of extension "X", at least a pair of idle wheels 5 positioned symmetrically relative to the main axis of extension "X" and, if necessary, also a pair of directional wheels 7 kinematically connected to the steering and drive wheel 4.

Preferably, if the number of wheels is even, the dolly 1 has at least one steering wheel 4 and at least one directional wheel 7 positioned symmetrically relative to the main axis of extension "X" and coupled to each other by a kinematic mechanism and at least one pair of idle wheels 5 also positioned symmetrically relative to the main axis of extension "X".

According to another aspect of this invention, if the dolly 1 has a number of wheels greater than five, it is possible to position a steering and/or drive wheel 10 at an opposite end of the dolly relative to the steering and drive wheel 4. As shown in FIG. 5, the further wheel 10 is located in a position aligned with the steering and drive wheel 4 along the main axis of extension "X" and has the same dimensions as the steering and drive wheel 4.

Advantageously, this solution allows improved directional accuracy and traction of the dolly 1 if the dolly 1 must transport very large loads.

As shown in the accompanying drawings, the dolly 1 also comprises a loading platform 3 mounted above the frame 2 and configured for receiving packs of material to be transported.

Preferably, the loading platform 3 comprises a first portion 3a located above the steering and drive wheel 4 and a second portion 3b positioned above the pair of idle wheels 5.

Since the steering and drive wheel 4 is larger than the idle wheels 5 and therefore protrudes from the frame 2, the first portion 3a of the loading platform 3 is positioned at a height above the ground greater than a height above the ground at which the second portion 3b is positioned.

Advantageously, this arrangement of the loading platform 3 facilitates the operations for loading and unloading the packs of material since it prevents the loading platform 3, due to the size of the steering wheel 4, from lying entirely at a height which is too high relative to the ground and therefore inconvenient for picking up or loading material.

If there are two steering and traction wheels 4, 10 having dimensions (in terms of diameter) greater than the idle wheels 5, as in the embodiment of FIG. 5, the loading platform 3 may have two portions 3a positioned at a height above the ground greater than the height at which the second portion 3b of the platform 3 lies.

Preferably, the loading platform 3 may be made as an oscillating platform in such a way as to further facilitate loading and unloading operations.

Even more preferably, the loading platform 3 comprises a sliding system 8 configured to promote the operation for loading and/or unloading one or more packs of material. In the embodiment illustrated in the accompanying drawings, the sliding system 8 comprises a bed of rollers. In a further embodiment, the sliding system 8 may comprise polyzen guides.

As shown in the accompanying drawings, the dolly 1 also comprises a control structure 6 comprising a plurality of sensors 22 configured for measuring a respective plurality of operating parameters of the dolly 1 and for generating respective signals representing operating parameters.

Preferably, the sensors of the control structure 6 are selected from one or more of the following types of sensors: proximity sensors, position sensors, lasers, video cameras (infrared optics) ultra-wideband systems, RFID systems, radar or optical systems in general.

As shown in the accompanying drawings, the control structure 6 is positioned at a rear end or at a front end of the frame 2 relative to a direction of travel of the dolly 1.

Preferably, the control structure 6 is positioned close to the steering wheel 4.

Advantageously, this arrangement of the control structure 6 allows the loading platform 3 to be left clear in such a way as not to affect the load capacity of the latter.

In a further possible embodiment, not illustrated, the dolly 1 comprises two control structures 6 positioned at a respective end of the frame 2. This arrangement is particularly advantageous if the dolly 1 reverses its direction of movement without turning a curve, for example if the dolly 1 has to operate in a particularly narrow corridor.

Advantageously, therefore, the presence of two control structures 6 allows the dolly 1 to detect the obstacles even if its direction of movement is reversed without the dolly 1 being made to turn a curve in order to reverse its motion.

Preferably, the control structure 6 is substantially in the shape of a parallelepiped and has an adaptable height in the case of loads of particular dimensions and shapes.

Even more preferably, the height of the control structure 6 is between 0.5 m and 1.8 m, preferably 1.6 m.

Advantageously, the shape and positioning of the control structure 6 allow the necessary components to be installed easily and conveniently in the structure 6.

Advantageously, the dimensions together with the position of the control structure 6, make the control structure 6 particularly effective in detecting obstacles which are also raised relative to the ground on which the dolly 1 moves, thereby avoiding impact or falling of the packs of material positioned on the loading platform 3.

In order to process the representative signals coming from the sensors 22 and for delineating the trajectory of the dolly 1, the control structure 6 also comprises a processing and communication unit 26.

In a possible embodiment, the processing and control unit allows the dolly 1 to move along a path by means of an autonomous guide system.

In other words, in this embodiment, the dolly 1 is an autonomously guided self-propelled dolly also known as a AGV (Automated Guided Vehicle) wherein the signals coming from the sensors are processed by the processing and communication unit to determine an optimum trajectory or to autonomously avoid any obstacles located along the trajectory.

In more detail, the processing and communication unit is configured for receiving the representative signals and for imparting a steering or drive command to the steering and drive wheel 4 at least as a function of the representative signals.

Advantageously, the presence of the sensors together with the presence of the processing and communication unit allows the dolly 1 to be guided in a fully autonomous manner even along trajectories which are not rectilinear, therefore giving the dolly 1 a high degree of efficiency and reliability.

In a further embodiment, the processing and communication unit is configured for receiving and sending information, such as, for example, the representative signals coming from the sensors, to a remote control device.

In other words, in this embodiment, the dolly 1 is a dolly of the remote control type wherein the processing and communication unit can receive input remotely, such as, for example, information on the best path to be followed or information regarding the moment and the amplitude of the steering of the steering and drive wheel 4 so as to correctly move the dolly 1.

According to another aspect of this invention, the dolly 1 also comprises a coupling device 24 configured to couple the dolly 1 with a further dolly 1 in such a way as to create a sort of "train" wherein a first dolly 1 guides a second dolly 1 preferably having a series of wheels in an idle configuration, that is to say, in a configuration where the wheels are free to follow the trajectory set by the first dolly 1.

In this situation, the first dolly 1 performs the function of "locomotive" and directs the second dolly 1 in such a way that the latter follows the trajectory set by the first dolly 1.

Preferably, the coupling means are selected between: tow or operating hooks, drawbars for the connection or for the movement.

Preferably, the tow hooks and/or the drawbars might also be used for manual movement of the dolly 1 if necessary.

Advantageously, the presence of coupling means makes the dolly 1, coupled with other dollies 1, versatile for a fully manual use or a use in which the traction of the dolly is used.

In a further embodiment, the dolly 1 can be coupled by the attachment means to a device equipped with traction or idle wheels such as, for example, a small trailer.

According to another aspect of this invention, the dolly 1 is able to exchange information and data with other dollies 1 in such a way as to prevent impacts between the various dollies 1 moved in the same place. More specifically, the processing and communication unit of the dolly 1 is able to receive and send a plurality of information to a processing and communication unit of other dollies 1 in such a way that it is possible to organize and control the various trajectories without the risk of crossing or impact between the dollies 1.

Preferably, the exchange of information between dollies 1 may be performed by Bluetooth, Wi-Fi, Lora, NFC systems and the like.

Advantageously, the invention achieves the preset aims eliminating the drawbacks of the prior art.

More specifically, the presence of a steering and drive wheel 4 and a drive rod makes the dolly 1 particularly versatile and easy to operate.

The presence of a steering and driving wheel 4 allows the dolly 1 to follow curvilinear trajectories also having a particularly tight radius of curvature.

Moreover, the positioning of the control structure 6 and its dimensions makes it possible to control better and autonomously the trajectory followed by the dolly 1, allowing, for example, the dolly 1 to identify remotely and therefore avoid obstacles which are even raised above the ground.

The possibility of processing the information coming from the sensors using the processing and communication unit makes it possible to delineate an optimum trajectory for the dolly 1.

The positioning of the loading platform 3 is convenient and practical to facilitate loading and unloading of packs of material.

The invention claimed is:

1. A dolly comprising:
   a supporting frame extending along a main axis of extension;
   a loading platform mounted above said supporting frame;
   at least one steering and drive wheel coupled to a bottom of the supporting frame;
   at least one pair of idle wheels coupled to the bottom of the supporting frame and positioned symmetrically with respect to said main axis of extension;
   a control box comprising a plurality of sensors configured for measuring a plurality of operating parameters of said dolly and for generating respective signals representing said operating parameters and a processing and communication unit configured for receiving said representative signals and for imparting a steering and pulling command to said at least one steering and drive wheel at least as a function of said representative signals.

2. The dolly according to claim 1, further comprising:
   a pair of directional wheels interposed between said at least one steering and drive wheel and said at least one pair of idle wheels, said pair of directional wheels being positioned symmetrically about said main axis of extension;
   a transmission rod configured for kinematically coupling said pair of directional wheels with said at least one steering and drive wheel such that said pair of directional wheels steer together with said at least one steering and drive wheel.

3. The dolly according to claim 2, wherein said at least one steering and drive wheel is positioned on said main axis of extension.

4. The dolly according to claim 1, also comprising at least one directional wheel, said at least one directional wheel and said at least one steering and drive wheel being positioned symmetrically with respect to said main axis of extension, and wherein said dolly also comprises a transmission rod, interposed between said at least one steering and drive wheel and said at least one directional wheel, configured for kinematically coupling said at least one directional wheel to said at least one steering and drive wheel in such a way that said directional wheel steers together with said at least one steering and drive wheel.

5. The dolly according to claim 1, wherein said loading platform comprises a first portion positioned above said at least one steering and drive wheel and a second portion positioned above said at least one pair of idle wheels, said first portion being positioned at a height above ground greater than a height above the ground of said second portion.

6. The dolly, according to claim 1, wherein said at least one steering and drive wheel has a diameter greater than a diameter of said at least one pair of idle wheels and wherein said loading platform comprises a first portion positioned above said at least one steering and drive wheel and a second portion positioned above said at least one pair of idle wheels, said first portion being positioned at a height above ground greater than a height above the ground of said second portion.

7. The dolly according to claim 1, wherein said control box is positioned at at least one chosen from a rear end and a front end of said supporting frame relative to a direction of travel of the dolly.

8. The dolly according to claim 1, wherein said control box has a height of between 0.5 m and 1.9 m.

9. The dolly according to claim 1, wherein said sensors are selected from one or more of the following group: proximity sensors, speed sensors, lasers, video cameras (infrared optics) ultra-wideband systems, RFID devices, radar, and optical systems.

10. The dolly according to claim 1, wherein said loading platform comprises a sliding system configured for promoting at least one chosen from loading and unloading a load on said loading platform.

11. The dolly according to claim 1, also comprising a coupler configured for coupling the dolly with a further dolly or with another device including at least one chosen from drive wheels and idle wheels.

12. The dolly according to claim 8, wherein said control box has a height of approximately 1.6 m.

13. The dolly according to claim 10, wherein sliding system comprises at least one chosen from a bed of rollers and polyzen guides.

* * * * *